(12) United States Patent
Wei et al.

(10) Patent No.: US 11,467,258 B2
(45) Date of Patent: Oct. 11, 2022

(54) COMPUTATION DEVICE, SENSING DEVICE AND PROCESSING METHOD BASED ON TIME OF FLIGHT

(71) Applicants: LITE-ON ELECTRONICS (GUANGZHOU) LIMITED, Guangzhou (CN); Lite-On Technology Corporation, Taipei (TW)

(72) Inventors: Shou-Te Wei, Taipei (TW); Wei-Chih Chen, Taipei (TW); Jun-Hao Wu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 520 days.

(21) Appl. No.: 16/660,823

(22) Filed: Oct. 23, 2019

(65) Prior Publication Data
US 2020/0264281 A1    Aug. 20, 2020

Related U.S. Application Data

(60) Provisional application No. 62/807,246, filed on Feb. 19, 2019.

(30) Foreign Application Priority Data

Jun. 21, 2019    (CN) .......................... 201910541119.2

(51) Int. Cl.
*G01S 17/10*    (2020.01)
*G01S 7/48*    (2006.01)
(Continued)

(52) U.S. Cl.
CPC ............ *G01S 7/4808* (2013.01); *G01S 17/10* (2013.01); *G01S 17/32* (2013.01); *G01S 17/89* (2013.01);
(Continued)

(58) Field of Classification Search
None
See application file for complete search history.

(56) References Cited

U.S. PATENT DOCUMENTS

2013/0301093 A1* 11/2013 Awatsuji .............. G03H 1/0443
359/22
2019/0219696 A1* 7/2019 Xu ........................ G01S 7/4911

FOREIGN PATENT DOCUMENTS

CN    105894492    8/2016

OTHER PUBLICATIONS

"Office Action of Taiwan Counterpart Application", dated Nov. 13, 2019, p. 1-p. 7.

* cited by examiner

*Primary Examiner* — Eileen M Adams
(74) *Attorney, Agent, or Firm* — JCIPRNET

(57) ABSTRACT

A computation device, a sensing device and a processing method based on time-of-flight (ToF) ranging are provided. In the method, intensity information of at least two phases corresponding to at least one pixel is obtained. The intensity information is generated by sensing a modulation light with time delays using these phases. Whether to abandon the intensity information of the at least two phases corresponding to the pixel is determined according to the difference between the intensity information of the at least two phases. Accordingly, the influence caused by motion blur would be reduced on depth information estimation.

15 Claims, 13 Drawing Sheets

(51) Int. Cl.
*G06T 7/00* (2017.01)
*G01S 17/89* (2020.01)
*G01S 17/32* (2020.01)
(52) U.S. Cl.
CPC .. *G06T 7/0002* (2013.01); *G06T 2207/20201* (2013.01); *G06T 2207/30168* (2013.01)

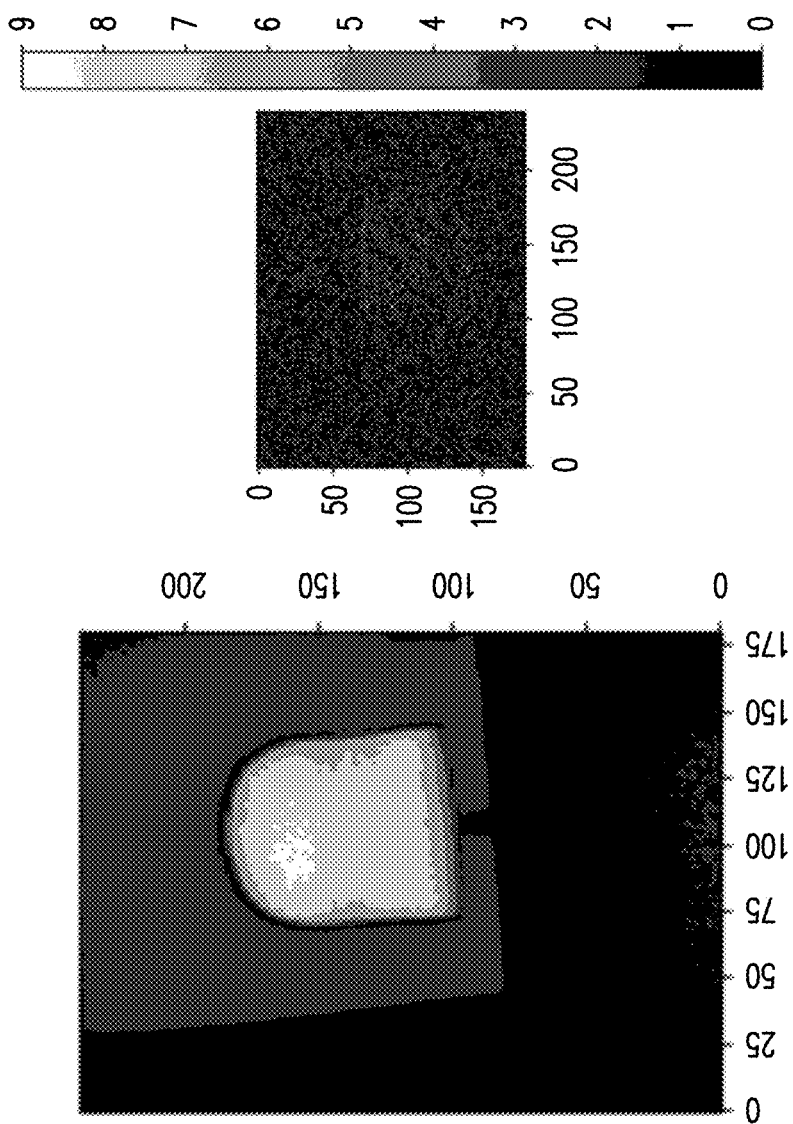

COMPUTATION DEVICE, SENSING DEVICE AND PROCESSING METHOD BASED ON TIME OF FLIGHT

CROSS-REFERENCE TO RELATED APPLICATION

This application claims the priority benefits of U.S. provisional application Ser. No. 62/807,246, filed on Feb. 19, 2019, and China application serial no. 201910541119.2, filed on Jun. 21, 2019. The entirety of each of the above-mentioned patent applications is hereby incorporated by reference herein and made a part of this specification.

BACKGROUND

Technical Field

The disclosure relates to an optical measurement technology, and in particular, to a computation device, a sensing device and a processing method based on time-of-flight (ToF) ranging.

Description of Related Art

With the development of science and technology, the optical three-dimensional measurement technology has gradually matured, and time-of-flight (ToF) ranging is now a common active depth sensing technology. The basic principle of the ToF ranging technology is that modulation light (e.g., infrared light or laser light, etc.) is reflected by an object after being emitted, and the distance of the object being photographed is calculated through conversion based on a reflection time difference or a phase difference of the reflected modulation light, so as to generate depth information relative to the object.

Referring to a timing diagram of FIG. 1A, in the ToF ranging technology, the time at which the modulation light is sensed is referred to as exposure time, which is similar to camera shutter time. For example, Logic 1 represents exposure/sensing, while Logic 0 represents ceasing of exposure. When the exposure time increases, the amount of data receiving the modulation light also increases. However, a longer exposure time may cause motion blur. For example, FIG. 1B shows a ghost caused by the movement of an object. FIG. 1C shows a light track caused by the movement of a vehicle lamp. However, when depth information is computed by using the ToF ranging technology, in the case of encountering motion blur, the depth distance may be inaccurate or a frame may be blurred. Therefore, how to provide a simple and effective measure to reduce the influence of motion blur has become an issue to work on in relevant fields.

SUMMARY

In view of this, the embodiments of the disclosure provide a computation device, a sensing device and a processing method based on ToF, which can effectively avoid invalid deep computing caused by motion blur.

The computation device based on ToF of the embodiments of the disclosure includes a memory and a processor. The memory records intensity information of at least two phases corresponding to at least one pixel and a programming code corresponding to a processing method for the computation device. The intensity information is generated by sensing a modulation light with time delays using the phases. The processor is coupled to the memory, and configured to execute the programming code. The processing method includes the following steps. Intensity information of at least two phases is obtained. Whether to abandon the intensity information of the at least two phases corresponding to the pixel is determined according to the difference between the intensity information of the phases.

The sensing device based on ToF of the embodiments of the disclosure includes a modulation-light emitting circuit, a modulation-light receiving circuit, a memory, and a processor. The modulation-light emitting circuit emits a modulation light. The modulation-light receiving circuit receives the modulation light with time delays using at least two phases. The memory records intensity information of at least two phases corresponding to at least one pixel and a programming code corresponding to a processing method for the sensing device. The processor is coupled to the modulation-light receiving circuit and the memory, and configured to execute the programming code. The processing method includes the following steps. Intensity information of at least two phases is obtained. The intensity information is generated by sensing a modulation light with time delays using the phases. Whether to abandon the intensity information of the phases corresponding to the pixel is determined according to the difference between the intensity information of the phases.

On the other hand, the processing method based on ToF of the embodiments of the disclosure includes the following steps. Intensity information of at least two phases corresponding to at least one pixel is obtained. The intensity information is generated by sensing a modulation light with time delays using the phases. Whether to abandon the intensity information of the phases corresponding to the pixel is determined according to the difference between the intensity information of the phases.

Based on the above, in the computation device, the sensing device and the processing method based on ToF ranging according to the embodiments of the disclosure, whether motion blur occurs is evaluated according to the difference between the intensity information of two phases, a pixel exhibiting motion blur is abandoned accordingly, and re-photography is performed or only valid pixels are adopted. Accordingly, the influence of motion blur on depth information estimation can be effectively alleviated.

In order to make the aforementioned and other objectives and advantages of the disclosure comprehensible, embodiments accompanied with figures are described in detail below.

BRIEF DESCRIPTION OF THE DRAWINGS

FIGS. 6A to 6D illustrate an example of global motion blur.

DESCRIPTION OF THE EMBODIMENTS

Figure 1A:
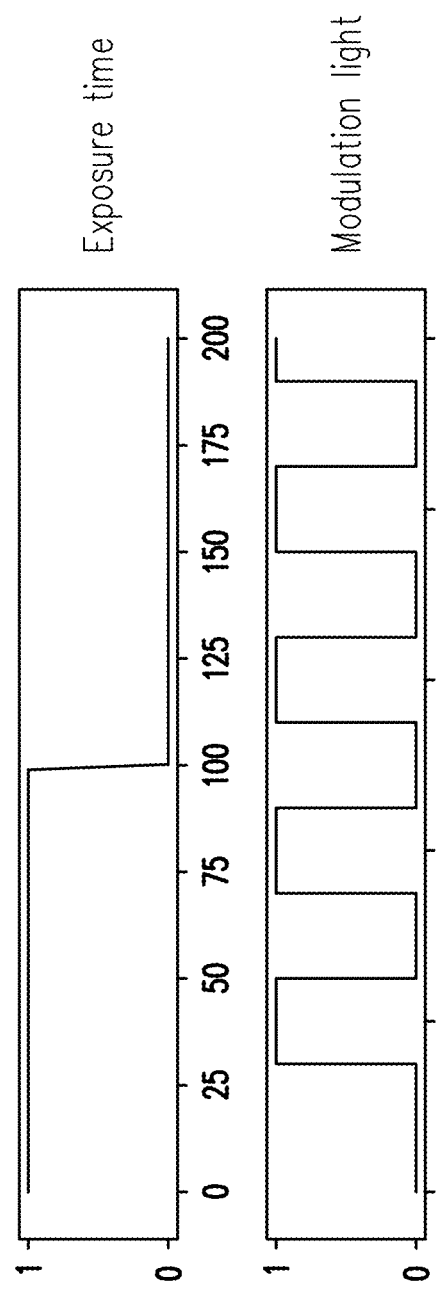
FIG. 1A is a timing diagram illustrating an exposure time and a modulation-light signal.
Figure 1B:
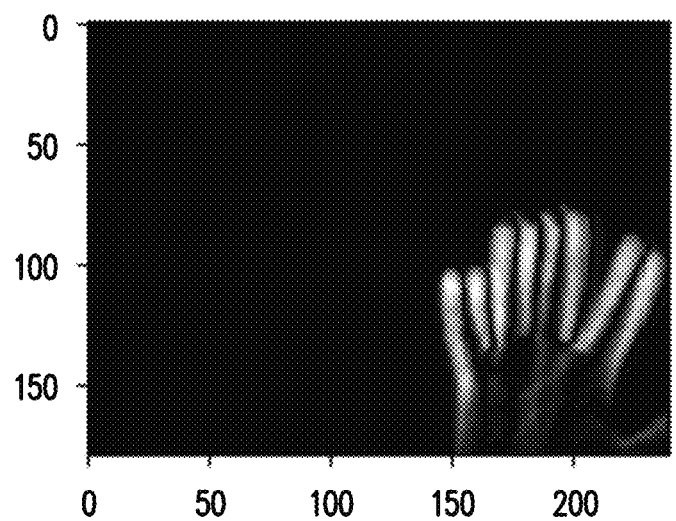
FIG. 1B and FIG. 1C are two examples illustrating motion blur.
Figure 1C:
Figure 2:
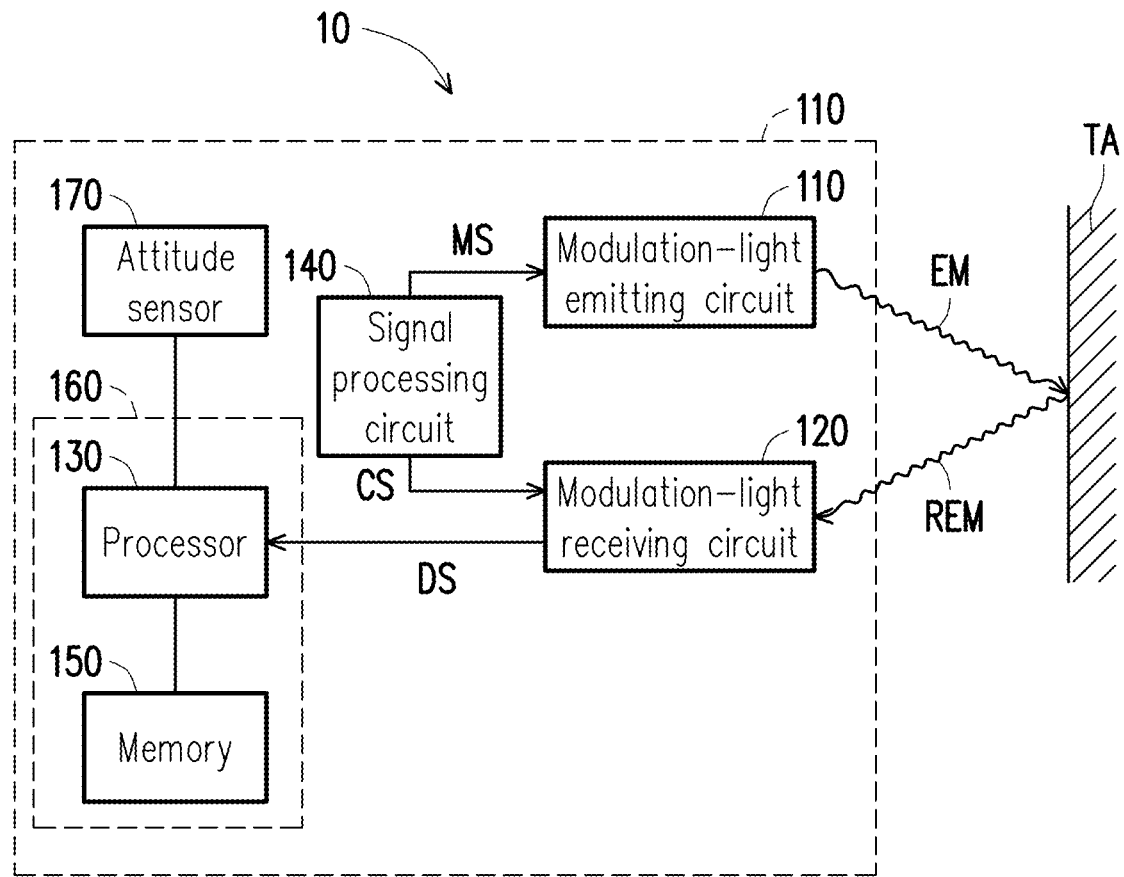
FIG. 2 is a schematic diagram of a ranging system according to an embodiment of the disclosure.

FIG. 2 is a schematic diagram of a ranging system 10 according to an embodiment of the disclosure. Referring to FIG. 2, the ranging system 10 includes a sensing device 100 based on ToF and a target object TA.

The sensing device 100 includes, but is not limited to, a modulation-light emitting circuit 110, a modulation-light receiving circuit 120, a processor 130, a signal processing circuit 140, a memory 150, and an attitude sensor 170. The sensing device 100 may be applied to fields such as three-dimensional modeling, object recognition, vehicle auxiliary systems, positioning, line testing, or error correction. The sensing device 100 may be a stand-alone device or may be loaded into other devices by modularization, and is not intended to limit the scope of the disclosure.

The modulation-light emitting circuit 110 is, for example, a laser diode or a collimated light generating device. The modulation-light receiving circuit 120 is, for example, an imaging device or a light source sensing device (including at least a photosensor, a reading circuit, etc.). The signal processing circuit 140 is coupled to the modulation-light emitting circuit 110 and the modulation-light receiving circuit 120. The signal processing circuit 140 is configured to provide a modulation signal MS for the modulation-light emitting circuit 110 and provides a control signal CS for the modulation-light receiving circuit 120. The modulation-light emitting circuit 110 is configured to emit a modulation light EM according to the modulation signal MS. The modulation light EM is, for example, an infrared light, a laser light or a collimated light of other bands. For example, the modulation signal MS is a pulse signal. A rising edge of the modulation signal MS corresponds to a trigger time of the modulation light EM. The modulation light EM will be reflected after encountering the target object TA. The modulation-light receiving circuit 120 may receive a reflected modulation light REM. The modulation-light receiving circuit 120 demodulates the reflected modulation light REM according to the control signal CS to generate a sensing signal DS.

Figure 3A:
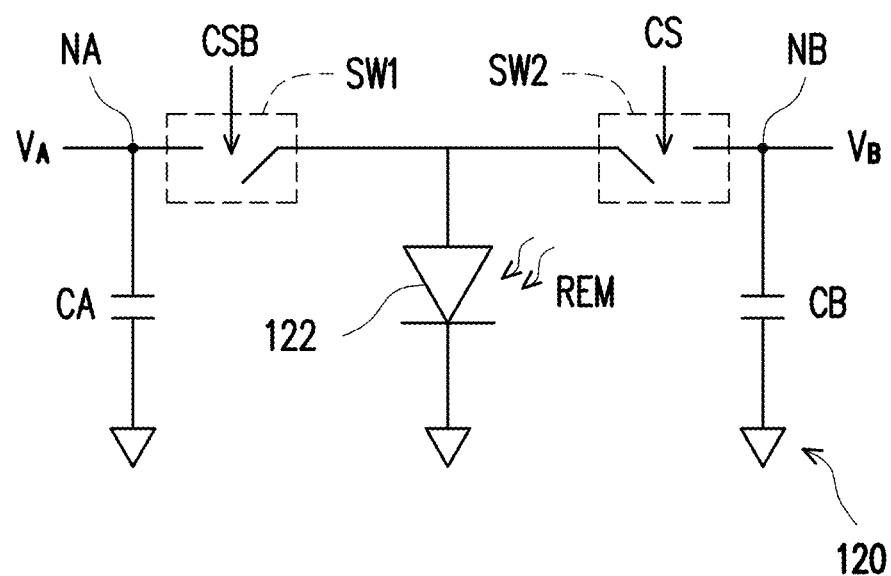
FIG. 3A is a schematic circuit diagram of a modulation-light receiving circuit according to an embodiment of the disclosure.

More specifically, FIG. 3A is a schematic circuit diagram of a modulation-light receiving circuit 120 according to an embodiment of the disclosure. Referring to FIG. 3A, for convenience of explanation, the figure takes a unit/single pixel circuit as an example. The modulation-light receiving circuit 120, corresponding to the unit/single pixel circuit, includes a photosensor 122, a capacitor CA, a capacitor CB, a switch SW1, and a switch SW2. The photosensor 122 is, for example, a photodiode or other light sensors having a similar function to sense the reflected modulation light REM. One end of the photosensor 122 receives a common reference voltage (e.g., ground GND), and the other end thereof is coupled to one end of the switch SW1 and the switch SW2. The other end of the switch SW1 is coupled to the capacitor CA through a node NA and controlled by an inverted signal CSB of the control signal CS. The other end of the switch SW2 is coupled to the capacitor CB through a node NB and is controlled by the control signal CS. The modulation-light receiving circuit 120 outputs a voltage (or current) signal $V_A$ on the node NA and a voltage (or current) signal $V_B$ on the node NB as the sensing signal DS. In another embodiment, the modulation-light receiving circuit 120 may also select to output the difference between the voltage signal $V_A$ and the voltage signal $V_B$ as the sensing signal DS (which may be used as intensity information).

The embodiment of FIG. 3A is merely illustrative. The circuit architecture of the modulation-light receiving circuit 120 is not limited thereto. The modulation-light receiving circuit 120 may have a plurality of photosensors 122, or more capacitors or switches. Those of ordinary skill in the art can make appropriate adjustments based on the usual knowledge and actual needs.

Figure 3B:
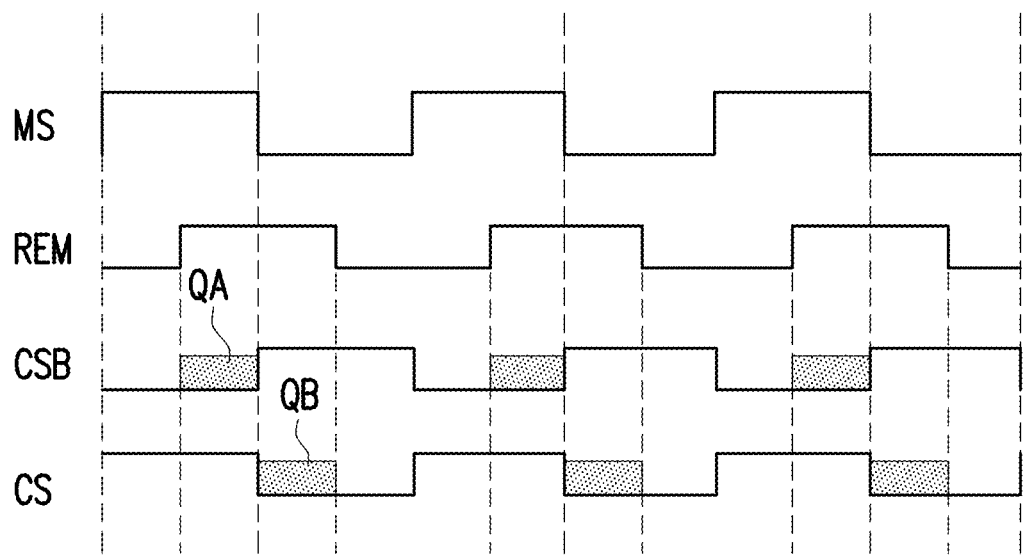
FIG. 3B is a schematic diagram of signal waveforms according to the embodiment of FIG. 3A.

FIG. 3B is a schematic diagram of signal waveforms according to the embodiment of FIG. 3A. Referring to FIG. 3A and FIG. 3B, when the inverted control signal CSB is at a low level (e.g., Logic 0), the switch SW1 is turned on. In this case, the control signal CS is at a high level (e.g., Logic 1), and the switch SW2 is not turned on. Conversely, when the control signal CS is at a low level (e.g., Logic 0), the switch SW2 is turned on. In this case, the inverted control signal CSB is at a high level (e.g., Logic 1), and the switch SW1 is not turned on. In addition, in response to the photosensor 122 being turned on, the photosensor 122 may receive the reflected modulation light REM. When the photosensor 122 and the switch SW1 are both turned on, the capacitor CA is discharged (or charged). QA in FIG. 3B represents the amount of charges changed by the capacitor CA, and the voltage signal $V_A$ on the node NA changes accordingly. When the photosensor 122 and the switch SW2 are both turned on, the capacitor CB is discharged (or charged). QB in FIG. 3B represents the amount of charges changed by the capacitor CB, and the voltage signal $V_B$ on the node NB changes accordingly.

The processor 130 is coupled to the modulation-light receiving circuit 120. The processor 130 may be a central processing unit (CPU), or other programmable general-purpose or special-purpose microprocessors, digital signal processors (DSP), programmable controllers, application specific integrated circuits (ASIC), other similar components, or a combination of the aforementioned components. In the embodiments of the disclosure, the processor 130 may compute a phase difference between the control signal CS and the reflected modulation light REM according to the sensing signal DS, and perform distance measurement according to the phase difference. For example, referring to FIG. 3B, according to the difference between the voltage signal $V_A$ and the voltage signal $V_B$, the processor 130 may compute the phase difference between the control signal CS and the reflected modulation light REM. It is to be noted that in some embodiments, the processor 130 may be internally provided with or electrically connected to an analog-to-digital converter (ADC), and converts the sensing signal DS into a signal in a digital form through the ADC.

The memory 150 is coupled to the processor 130. The memory 150 may be any type of fixed or mobile random access memory (RAM), flash memory, or traditional hard disk drive (HDD), solid-state disk (SSD), non-volatile memory, or similar components or a combination of the aforementioned components. In the present embodiment, the memory 150 is configured to store buffered or permanent data (e.g., intensity information corresponding to the sensing signal DS, a threshold, etc.), a programming code, a software module, an operating system, an application, a driver, or other data or files. The details thereof will be described in the subsequent embodiments. It is to be noted that the programming code recorded by the memory 150 is a processing method for the sensing device 100. The processing method will be described in detail in the subsequent embodiments.

The attitude detector 170 is coupled to the processor 130. The attitude detector 170 may be a G-sensor/accelerometer, an inertial sensor, a gyroscope, a magnetometer or a combination thereof for detecting motion or attitude such as acceleration, angular velocity or azimuth, and generating attitude information (e.g., recording data such as three-axis gravitational acceleration, angular velocity, or magnetic force).

It is to be noted that in some embodiments, the processor 130 and the memory 150 may be separated into the computation device 160. The computation device 160 may be a device such as a desktop computer, a notebook computer, a server, a smart phone, or a tablet computer. The computation device 160 and the sensing device 100 further have communication transceivers (e.g., transceivers supporting communication technologies such as Wi-Fi, Bluetooth or Ethernet) that can communicate with each other, so that the computation device 160 may obtain the sensing signal DS from the sensing device 100 or corresponding intensity information (which may be recorded in the memory 150 for access by the processor 130).

In order to facilitate the understanding of the operation flow of the embodiments of the disclosure, the operation flow of the sensing device 100 and/or the computation device 160 in the embodiments of the disclosure will be described with many embodiments in detail below. Hereinafter, the method described in the embodiments of the disclosure will be described in conjunction with various components and modules in the sensing device 100 and the computation device 160. The various flows of the present method may be adjusted accordingly according to the implementation situation, and are not limited thereto.

Figure 4:
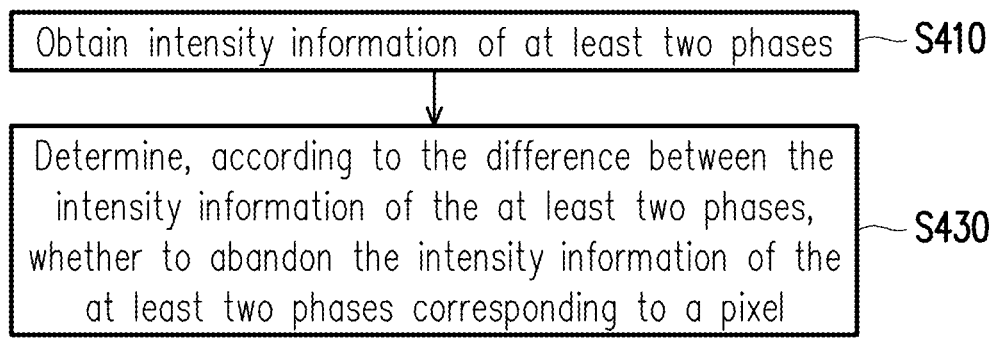
FIG. 4 is a flow chart of a processing method based on ToF ranging according to an embodiment of the disclosure.

FIG. 4 is a flow chart of a processing method based on ToF ranging according to an embodiment of the disclosure. Referring to FIG. 4, the processor 130 obtains intensity information of at least two phases corresponding to at least one pixel (step S410). Specifically, in the embodiment of FIG. 3B, the modulation signal MS is synchronized with the control signal CS, but the signal processing circuit 140 may also make the modulation signal MS and the control signal CS not synchronized. That is to say, the control signal CS and the modulation signal MS may have a reference phase. The signal processing circuit 140 delays or advances the phase of the modulation signal MS or the control signal CS according to different reference phases, so that the modulation signal MS and the control signal CS have a phase difference/phase delay.

In a continuous wave (CW) measurement mechanism, the phase difference is, for example, 0 degrees, 90 degrees, 180 degrees, and 270 degrees, that is, a four-phase method. Different phases correspond to a charge accumulation time interval at different start and end time points. In other words, the modulation-light receiving circuit 120 receives the reflected modulation light REM with time delays using four phases. The sensing signals DS corresponding to different phases may be obtained by sensing the reflected modulation light REM with time delays using the phases. The sensing signals DS may be further used as intensity information. The intensity information may record the amount of charges accumulated by a single pixel (one pixel corresponds to the circuit of FIG. 3A) or may be further converted into an intensity value. That is, the intensity information of each pixel is generated by sensing the reflected modulation light REM with time delays using the phases.

Figures 5A, 5B:
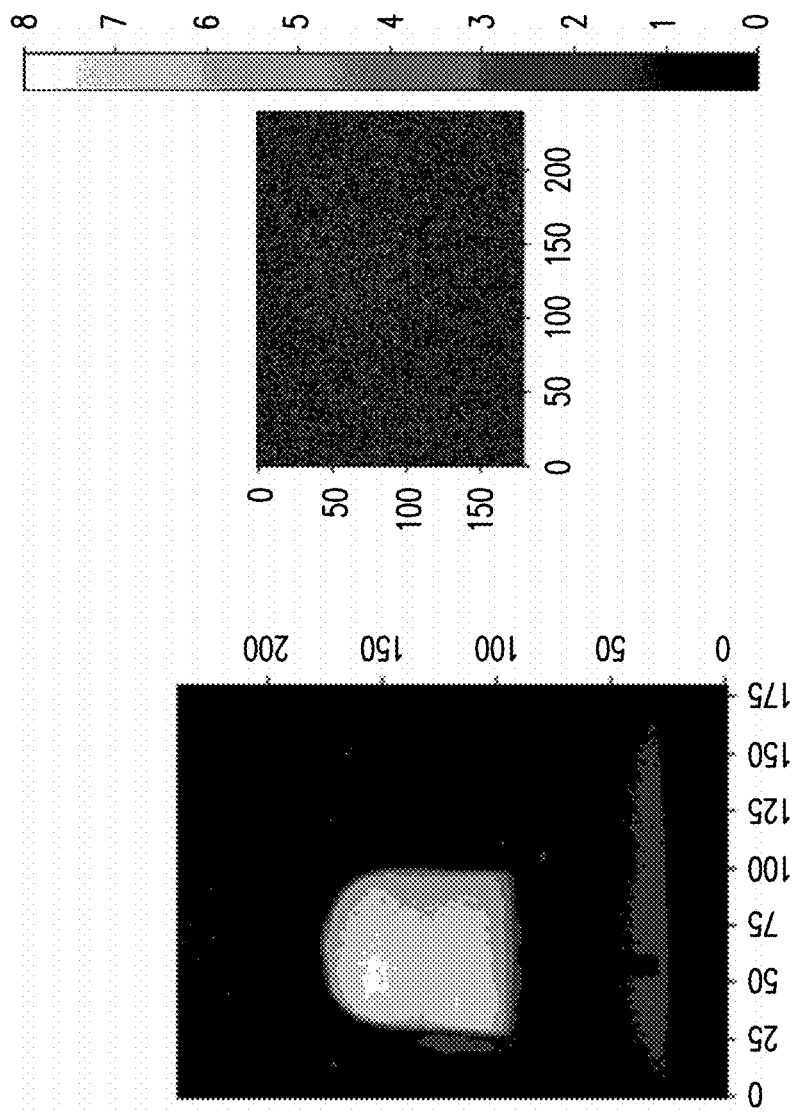
FIGS. 5A to 5D illustrate an example of local motion blur.
Figures 5C, 5D:
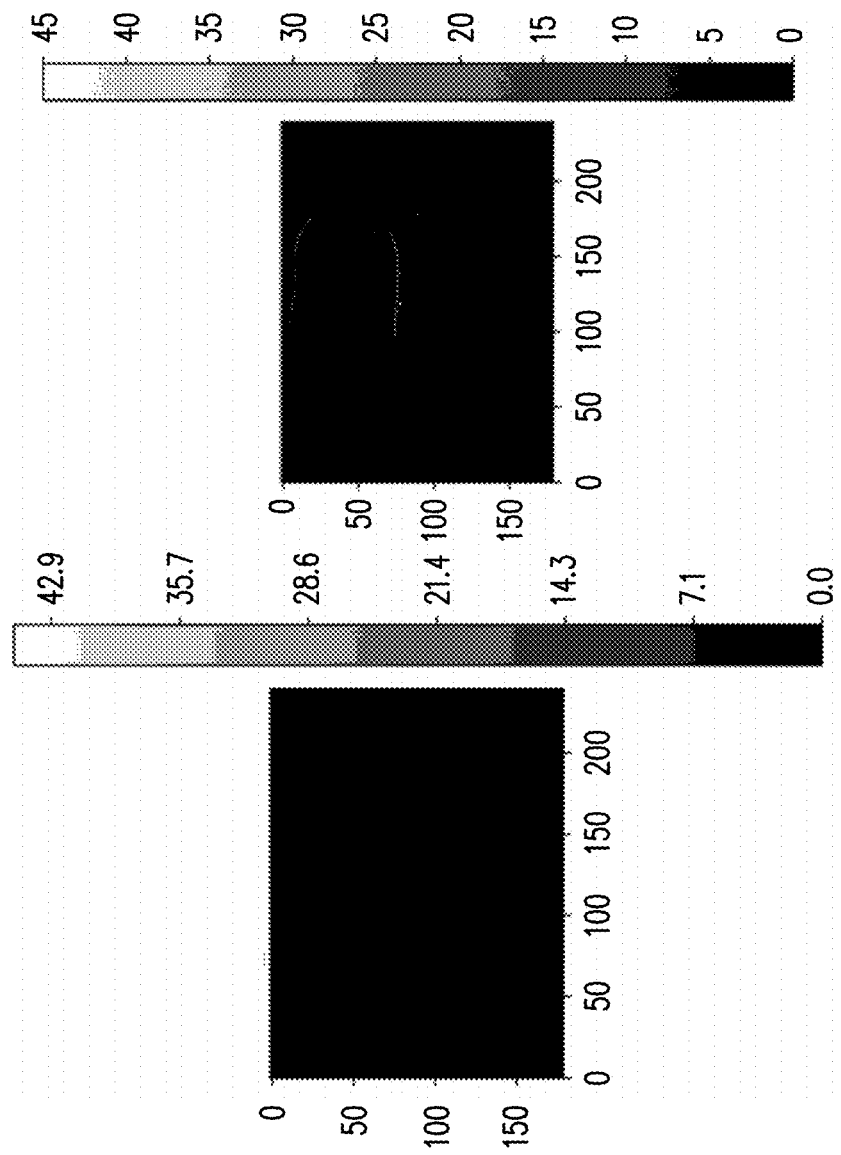

Next, the processor 130 determines, according to the difference between the intensity information of the at least two phases, whether to abandon the intensity information of the at least two phases corresponding to the pixel (step S430). Specifically, it has been experimentally shown that motion blur causes the difference of intensity information between different phases. For example, FIGS. 5A to 5D illustrate an example of local motion blur. Referring to FIG. 5A, an image (for example, the resolution is 240×180) generated according to the sensing signal DS when the target object TA (for example, a chair) and the sensing device 100 are both in a stationary state (for example, no shaking, no jumping, etc.) is shown in the figure. Referring to FIG. 5B, an image generated by subtracting (i.e., difference of intensity information) the intensity values of any two phases corresponding to the same time point is shown in the figure. Referring to FIG. 5C, a scaled image of FIG. 5B is shown, and it can be observed that the intensity differences of all pixels are substantially the same and equal to or approximate to zero. Next, it is assumed that the target object TA moves. Referring to FIG. 5D, an image generated by subtracting (i.e., difference of intensity information) the intensity values of any two phases corresponding to the same time point is shown in the figure. Compared with FIG. 5C, FIG. 5D can be observed that the intensity differences of some of the pixels are larger.

Figures 6C, 6D:
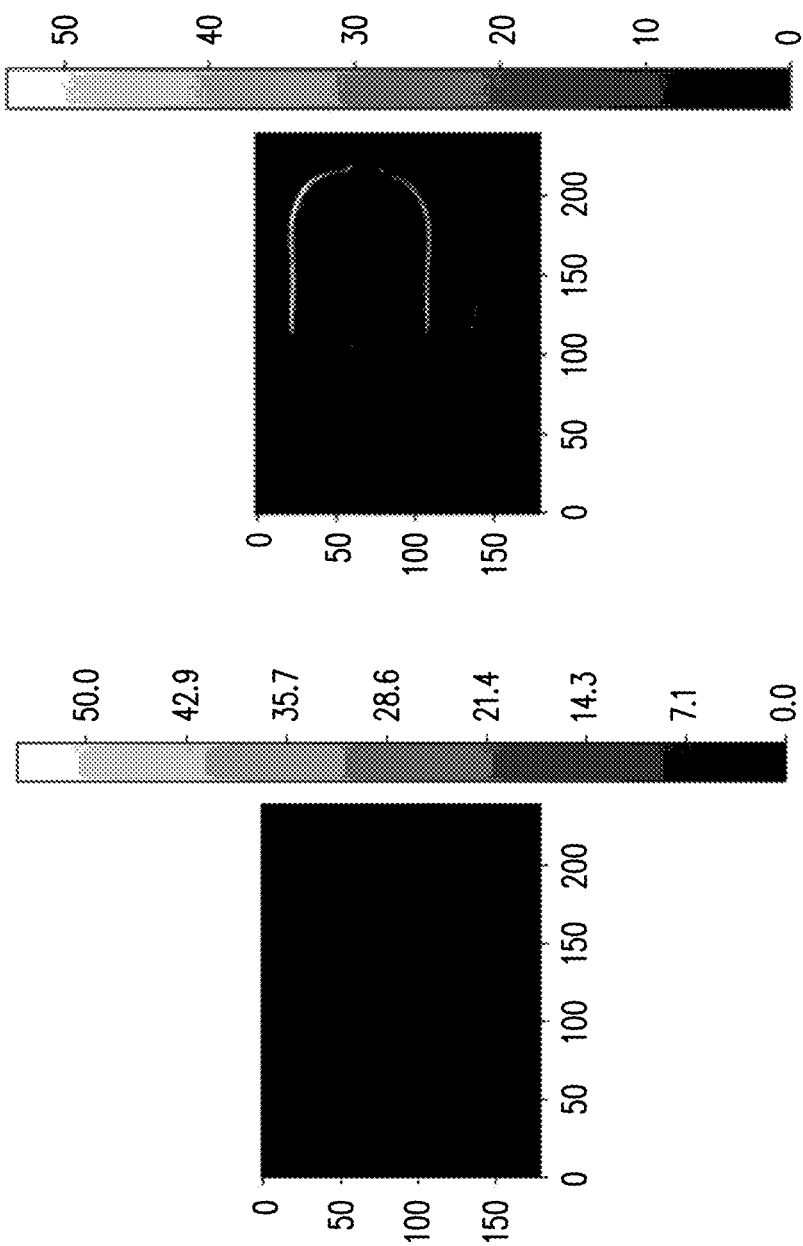

FIGS. 6A to 6D illustrate an example of global motion blur. Referring to FIG. 6A, an image (for example, the resolution is 240×180) generated according to the sensing signal DS when the target object TA (for example, a chair) and the sensing device 100 are both in a stationary state is shown in the figure. Referring to FIG. 6B, an image generated by subtracting (i.e., difference of intensity information) the intensity values of any two phases corresponding to the same time point is shown in the figure. Referring to FIG. 6C, a scaled image of FIG. 6B is shown, and it can be observed that the intensity differences of all pixels are substantially the same and equal to or approximate to zero. Next, it is assumed that the sensing device 100 moves. Referring to FIG. 6D, an image generated by subtracting (i.e., difference of intensity information) the intensity values of any two phases corresponding to the same time point is shown in the figure. Compared with FIG. 6C, FIG. 6D can be observed that the intensity differences of some of the pixels are larger.

It can be seen that the difference between the intensity information of two phases will increase regardless of the generation of a local or global motion blur. Conversely, if there is no motion blur, the difference between the intensity information of the two phases will be equal to or approximate to zero. Therefore, the difference between the intensity information of the two phases may be used to evaluate whether motion blur occurs.

In an embodiment, for each pixel, the processor 130 may determine whether the difference between intensity information of at least two phases is greater than a difference threshold. If the difference is greater than the difference threshold, the processor 130 abandons the intensity information of the phases corresponding to the pixel. Specifically, it is inevitable that the difference between the intensity information of the two phases may not be exactly equal to zero. Therefore, the embodiments of the disclosure improve the tolerance, so that the processor 130 may preset or have a threshold (e.g., 10, 20, or 40, etc.) set by a user. If the difference is less than the difference threshold, the processor 130 may be considered to have not experienced motion blur. Conversely, if the difference is greater than the difference threshold, the processor 130 may be directly considered to have experienced motion blur, or further evaluated through other information. It is worth noting that the intensity information of the pixels having the intensity values greater than the difference threshold may affect the results of subsequent depth information estimation. Therefore, the embodiments of the disclosure will abandon the intensity information of any of the four phases having the intensity value lower than the difference threshold according to some conditions. If the processor 130 abandons the intensity information of the phases, the processor will determine to adopt either the intensity information of the phases corresponding to the pixel at a different time point or the intensity information of different phases corresponding to other pixels that are not abandoned. If the intensity information of at least two phases corresponding to any pixel at a current time point is abandoned, it is necessary to sense again through the modulation-light receiving circuit 120, so as to obtain again the intensity information of the phases corresponding to the pixel at a different time point (subsequent time points), and then evaluate whether to use the intensity information. Alternatively, if the intensity information of the phases corresponding to only some of the pixels at the current time point is abandoned, the intensity information of different phases corresponding to the pixels that are not abandoned (or the retained pixels) will be used. In addition, the processor 130 may compute depth information according to the last used intensity information.

It is to be noted that for any pixel, the processor 130 may compare the difference between any two phases (e.g., 0 and 180 degrees, 180 and 270 degrees, etc.) with the difference threshold (the value thereof needs to be adjusted accordingly). In other embodiments, the processor 130 may also select the values of two phases with the largest difference to be compared with the difference threshold (the value thereof needs to be adjusted accordingly). Alternatively, the processor 130 may also randomly select intensity information of more phases for comparison. If more than two differences are obtained, they may be further averaged or compared with the difference threshold with a specific linear combination.

Figure 7:
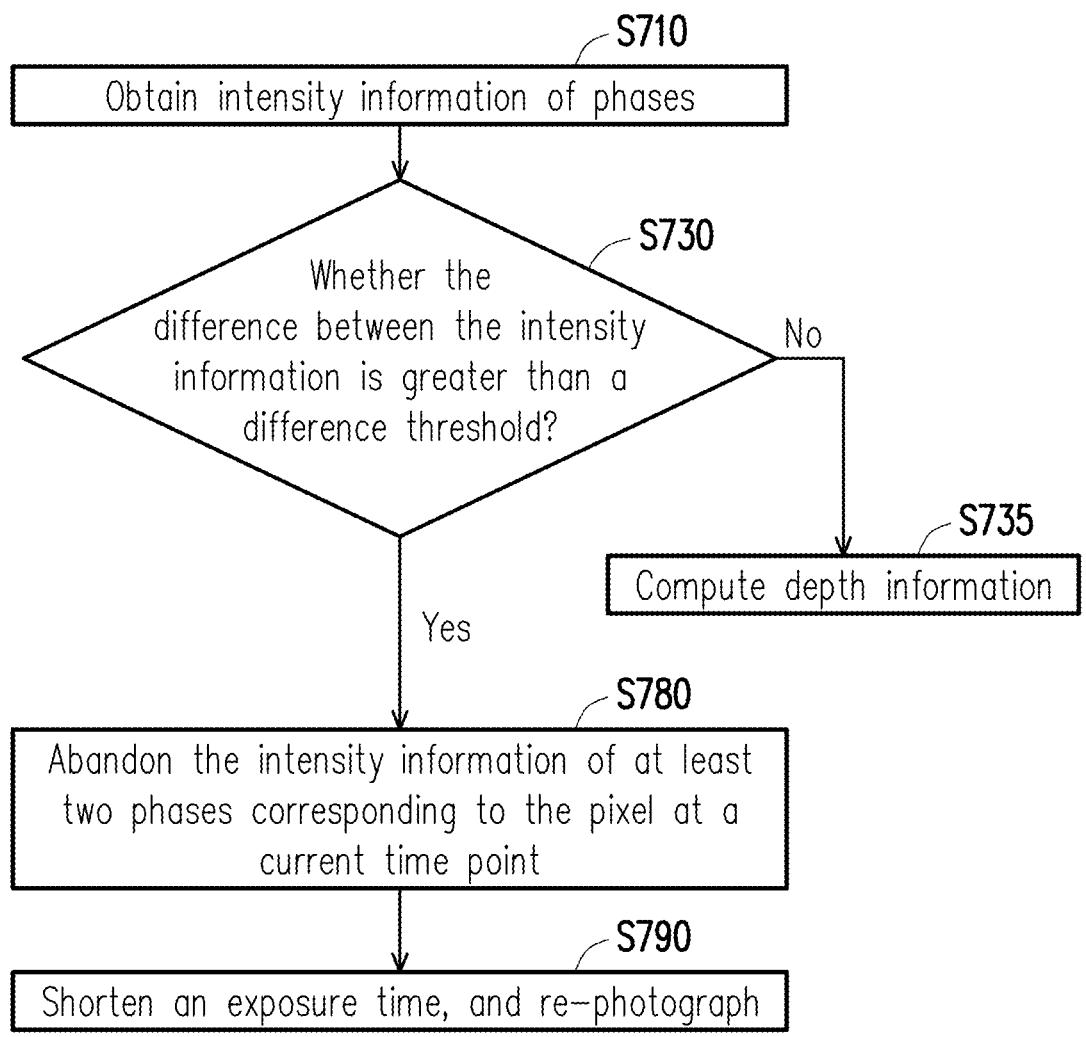
FIG. 7 is a flow chart of a processing method based on ToF ranging according to a first embodiment of the disclosure.

The following will detail the abandonment conditions and corresponding processing modes:

FIG. 7 is a flow chart of a processing method based on ToF ranging according to a first embodiment of the disclosure. Referring to FIG. 7, for each pixel, the processor 130 obtains intensity information of at least two phases (step S710), and determines whether the difference between the intensity information is greater than a difference threshold (step S730). The detailed description thereof may be referred to the descriptions of steps S410 and S430 respectively, and the descriptions thereof are omitted herein. Next, if the difference is not greater than the difference threshold, the processor 130 may compute depth information based on the intensity information of all the phases corresponding to the pixel at a current time point (step S735). For example, the difference between 0 and 180 degrees is taken as a real part, and the difference between 90 and 270 degrees is taken as an imaginary part. An angle formed by the real part and the imaginary part is taken as a phase difference $\varphi$, and the distance (that is, as the depth information) is $\frac{1}{2}*c*\varphi/2\pi*f$, where c is a light speed constant, and $f$ is a sampling frequency.

On the other hand, if the difference is greater than the difference threshold, the processor 130 may abandon/cancel/not use the intensity information of four phases of the pixel at the current time point (step S780), that is, the intensity information in a current accumulated charge time interval of the pixel is not used. The processor 130 may adaptively adjust an exposure time of detecting a modulation light of the phases when sensing through the modulation-light receiving circuit 120 next time. Since the motion blur can be improved by shortening the exposure time, the processor 130 may further notify the modulation-light receiving circuit 120 to shorten the exposure time to re-photograph/sense/receive a reflected modulation light REM (step S790), thereby obtaining the intensity information of at least two phases obtained by the pixel in response to the modulation light REM at a different time point.

Figure 8:
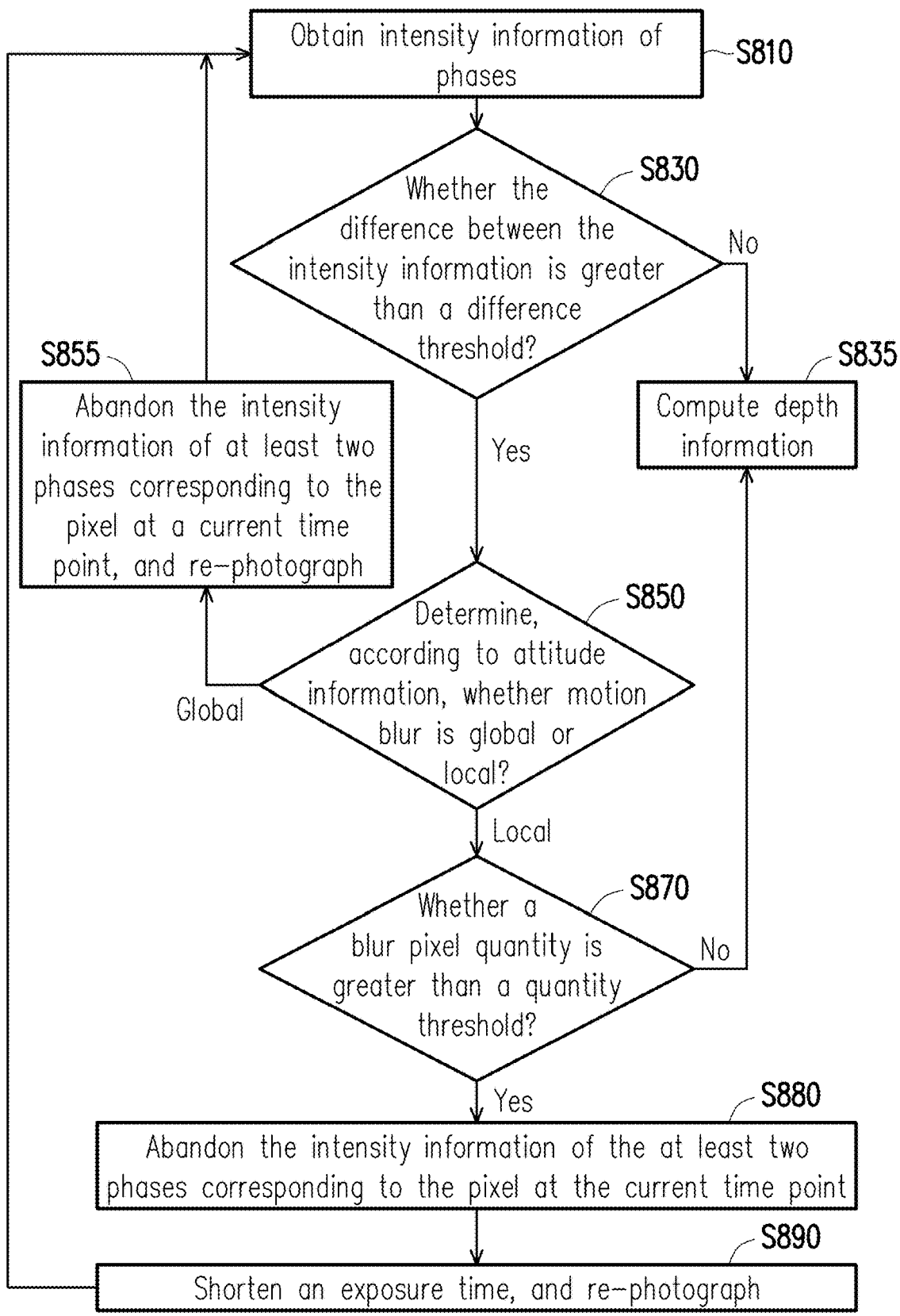
FIG. 8 is a flow chart of a processing method based on ToF ranging according to a second embodiment of the disclosure.

FIG. 8 is a flow chart of a processing method based on ToF ranging according to a second embodiment of the disclosure. Referring to FIG. 8, the details of steps S810, S830, S835, S880, and S890 may be referred to the descriptions of steps S710, S730, S735, S780, and S790, and the descriptions thereof are omitted herein. The difference from the first embodiment is that if the difference between the intensity information of the two phases is greater than a difference threshold, the processor 130 determines, according to attitude information obtained by the attitude sensor 170, whether motion blur causing the difference is global or local (step S850). Three-axis acceleration sensing values $X_{out}$, $Y_{out}$, and $Z_{out}$ are taken as an example. If $\sqrt{X_{out}^2+Y_{out}^2+Z_{out}^2}$ is 1 g, it is indicated that the sensing device 100 is in a stationary state and the difference is caused by the local motion blur (for example, the target object TA moves). If the value is not 1 g, it is indicated that the sensing device 100 is not in a stationary state and the difference is caused by the global motion blur. Noticeably, depending on the type of the attitude sensor 170, the conditions for determining the stationary state may be different. By applying the embodiments of the disclosure, corresponding parameters may be self-adjusted, which is not limiting the scope of the embodiments in the disclosure.

If the global motion blur is determined, the processor 130 directly abandons the intensity information of the phases corresponding to the pixel at the current time point, and photographs through the modulation-light receiving circuit 120 to obtain again intensity information of at least two phases of the pixel in a next accumulated charge time interval (step S855). On the other hand, if the local motion blur is determined, according to a blur pixel quantity, the processor 130 may further determine whether to obtain again, by the modulation-light receiving circuit 120, the intensity information of at least two phases of the pixel at a different time point. The blur pixel quantity is a quantity accumulated in response to a pixel being determined to have the motion blur. In other words, if the difference between the intensity information corresponding to a certain pixel is greater than the difference threshold, the blur pixel quantity is accumulated, and after all the pixels are evaluated, a final blur pixel quantity may be obtained.

It is worth noting that through experiments, different difference thresholds will correspond to different blur pixel quantities. In other words, for different difference thresholds, the proportions of pixels determined to have motion blur in a sensed image to all pixels may be different. 240×180 resolution is taken as an example. Table 1 shows blur pixel quantities corresponding to different difference thresholds and the proportions thereof:

TABLE 1

| Difference threshold | Blur pixel quantity | Proportion |
|---|---|---|
| 20 | 1329 | 3.076388889% |
| 30 | 1071 | 4.479166665% |
| 40 | 801 | 1.868055554% |

The blur pixel quantity obtained by the experiment in Table 1 may be used, for example, as a quantity threshold for comparison. But the quantity threshold may be adjusted according to different difference thresholds, different resolutions or other conditions, which is not limited by the embodiments of the disclosure. The processor 130 may determine whether a blur pixel quantity obtained at a current time point (or within a sampling interval) is greater than a set quantity threshold (step S870). If the blur pixel quantity is greater than the set quantity threshold, the processor 130 may abandon the intensity information of the phases corresponding to the pixel at the current time point (step S880), and photographs through the modulation-light receiving circuit 120 to obtain again intensity information of at least two phases corresponding to the pixel at a different time point (e.g., a next sampling time point or a subsequent sampling interval) (step S890). On the other hand, if the blur pixel quantity obtained within the current time interval is not greater than the set quantity threshold, the processor 130 directly computes depth information according to the intensity information of a plurality of phases corresponding to the pixel at the current time point (step S835), that is, the intensity information corresponding to the pixel is retained.

In an embodiment, the length of the exposure time adjusted in step S890 may be related to the difference between the blur pixel quantity and the quantity threshold. For example, the adjusted exposure time may be derived from equations (1) and (2):

$$\frac{blur\_pixels - threshold}{threshold} = \frac{exposure\_time - exposure\_time'}{exposure\_time} \quad (1)$$

$$exposure\_time' = -\left(\frac{blur_{pixels} - threshold}{threshold} - 1\right) \times exposure\_time \quad (2)$$

where exposure_time' is the adjusted exposure time, exposure_time is the original exposure time, blur_pixels is the blur pixel quantity, and threshold is the quantity threshold.

It is to be noted that in other embodiments, the modulation-light receiving circuit 120 may also directly shorten the exposure time of a specific length or a random length.

Figure 9:
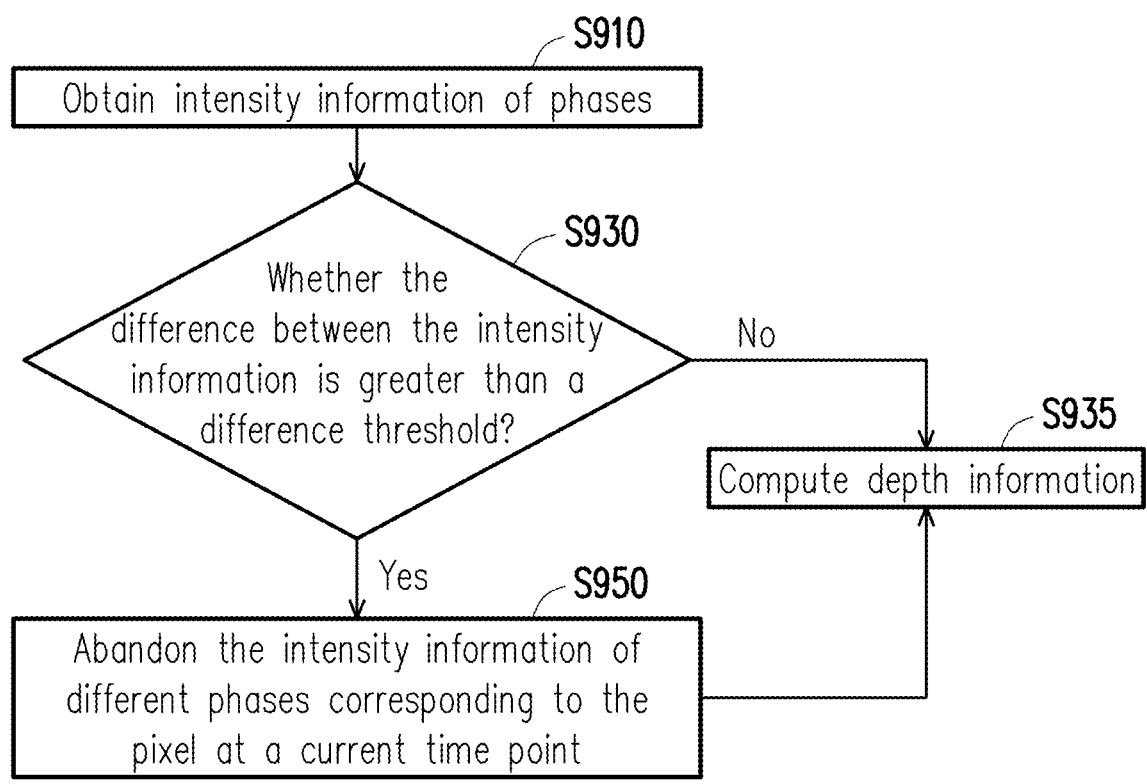
FIG. 9 is a flow chart of a processing method based on ToF ranging according to a third embodiment of the disclosure.

FIG. 9 is a flow chart of a processing method based on ToF ranging according to a third embodiment of the disclosure. Referring to FIG. 9, the details of steps S910, S930, S935, and S880 may be referred to the descriptions of steps S710, S730, S735, and S780, and the descriptions thereof are omitted herein. The difference from the first embodiment is that if the difference between the intensity information of at least two phases of any pixel is greater than the difference threshold, the processor 130 may only abandon/cancel/not use the intensity information of the phases corresponding to the pixel at the current time point (step 950). The abandoned pixel is determined to have the motion blur (for example, the intensity difference between the two phases of the pixel is greater than the difference threshold). The processor 130 may record position, index or code of the abandoned pixel in the sensed image. In step S935, the processor 130 computes the depth information according to the intensity information of the pixels that are not abandoned. It is to be noted that, among all the pixels, the pixels remaining after the abandoned pixels are excluded are the pixels that are not abandoned. Excluding the intensity information of the abandoned pixels will reduce the motion blur image, and the intensity information of the pixels determined to be unaffected by the motion blur may continue to be used for subsequent depth information computation. Accordingly, multiple re-photographs can be avoided and the efficiency can be further improved.

Figures 10A, 10B:
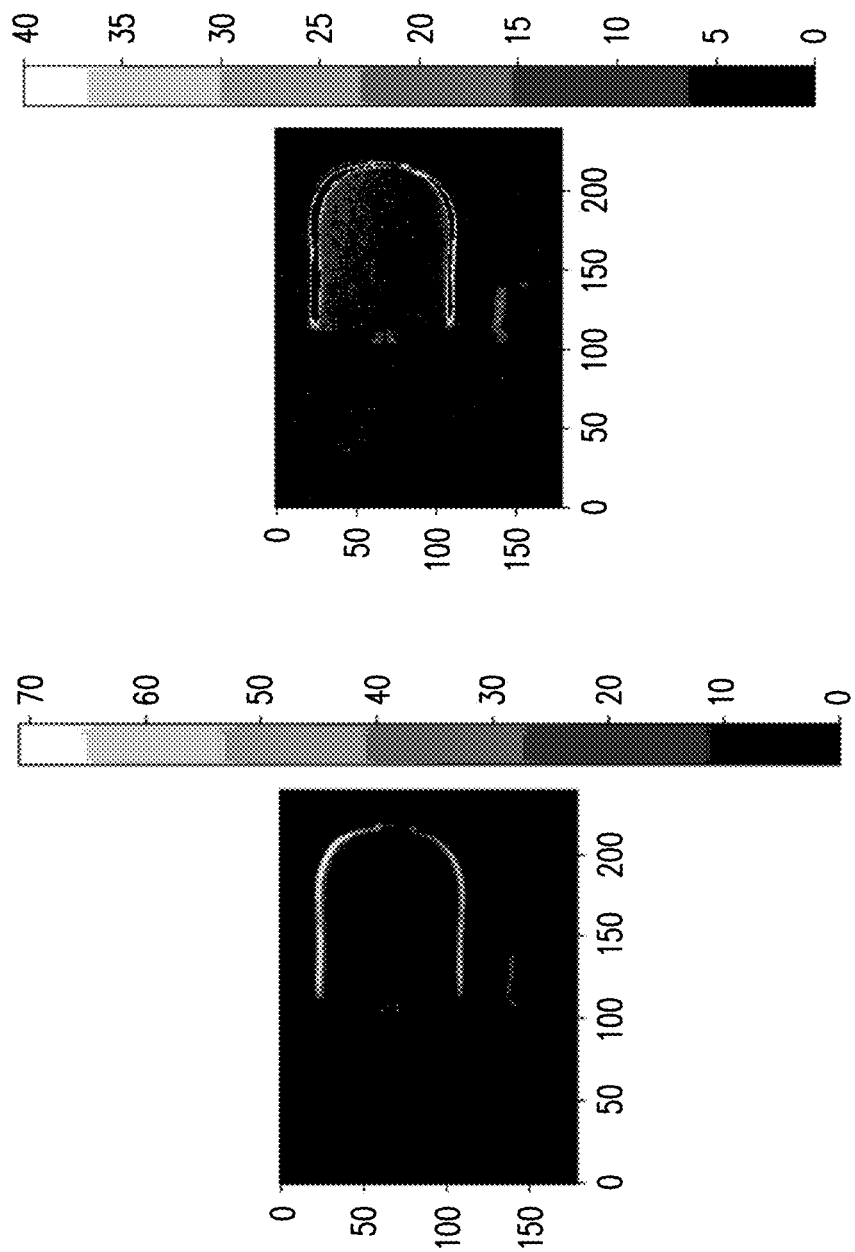
FIGS. 10A and 10B are schematic sensing diagrams illustrating abandoning of invalid data.

FIGS. 10A and 10B are schematic sensing diagrams illustrating abandoning of invalid data. Please referring first to FIG. 10A, an image that all pixels retain is shown in the figure. Referring next to FIG. 10B, assuming that the difference threshold is 40, a pixel having a difference of more than 40 will be abandoned. The processor 130 may set the intensity of the abandoned pixel to zero or to be ignored.

It is to be noted that the steps in the foregoing three embodiments may be interchanged, added, or changed according to actual needs. For example, a mechanism for determining the blur pixel quantity in step 870 can be further added in step 730 of the first embodiment, which is not limiting the scope of the disclosure.

Based on the above, the computation device, the sensing device and the processing method based on ToF ranging according to the embodiments of the disclosure, can determine whether motion blur occur based on the difference between intensity information of any two phases, the quantity of blur pixels, attitude information, or a combination thereof. If motion blur is evaluated as having occurred, re-photography may be performed, or the intensity information of some pixels with motion blur may be abandoned. Accordingly, the influence caused by motion blur would be simply improved for subsequent depth information estimation.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. Computation device based on time-of-flight (ToF) ranging, comprising:
 a memory, recording intensity information of at least two phases corresponding to at least one pixel and a programming code corresponding to a processing method for the computation device, wherein the intensity information is generated by sensing modulation light with time delays using the at least two phases; and
 a processor, coupled to the memory, and configured to execute the programming code, the processing method comprising:
 obtaining the intensity information of the at least two phases; and
 determining, according to a difference between the intensity information of the at least two phases, whether to abandon the intensity information of the at least two phases corresponding to the pixel;
 wherein determining whether to abandon the intensity information of the at least two phases corresponding to the pixel comprises:
 determining whether the difference is greater than a difference threshold; and in response to the difference being greater than the difference threshold, abandoning the intensity information of the at least two phases corresponding to the pixel.

2. Computation device based on ToF ranging according to claim 1, wherein the processing method further comprises:
adaptively adjusting an exposure time of detecting the modulation light of the at least two phases to obtain again the intensity information of at least two phases corresponding to the pixel at a different time point.

3. Computation device based on ToF ranging according to claim 1, wherein the processing method further comprises:
in response to abandoning the intensity information of the at least two phases corresponding to the pixel, determining whether to obtain again the intensity information of at least two phases corresponding to the pixel at a different time point; and
computing depth information according to the intensity information of different phases corresponding to a plurality of pixels.

4. Computation device based on ToF ranging according to claim 3, wherein the memory further records attitude information which corresponds to a device for sensing the modulation light of the at least two phases, and the processing method further comprises:
in response to the difference being greater than the difference threshold, determining, according to the attitude information, whether motion blur causing the difference is global or local;
in response to the motion blur being global, abandoning the intensity information of the at least two phases corresponding to the pixel, and obtaining again the intensity information of at least two phases corresponding to the pixel at a different time point; and
in response to the motion blur being local, determining, according to a blur pixel quantity, whether to obtain again the intensity information of at least two phases corresponding to the pixel at a different time point, wherein the blur pixel quantity is a quantity accumulated in response to the pixel being determined to have the motion blur.

5. Computation device based on ToF ranging according to claim 4, wherein the processing method further comprises:
in response to the blur pixel quantity being greater than a quantity threshold, abandoning the intensity information of the at least two phases corresponding to the pixel, and obtaining again the intensity information of at least two phases corresponding to the pixel at a different time point.

6. Computation device based on ToF ranging according to claim 3, wherein the processing method further comprises:
in response to the difference being greater than the difference threshold, abandoning the intensity information of the different phases corresponding to at least one of the pixels, wherein the at least one abandoned pixel is determined to have the motion blur; and
computing the depth information according to the intensity information of the different phases corresponding to a plurality of pixels that are not abandoned among the pixels.

7. Sensing device based on time-of-flight (ToF) ranging, comprising:
a modulation-light emitting circuit, emitting modulation light;
a modulation-light receiving circuit, receiving the modulation light with time delays using at least two phases;
a memory, recording intensity information of at least two phases corresponding to at least one pixel and a programming code corresponding to a processing method for the sensing device; and
a processor, coupled to the modulation-light receiving circuit and the memory, and configured to execute the programming code, the processing method comprising:
obtaining the intensity information of the at least two phases, wherein the intensity information is generated by sensing the modulation light with the time delays using the at least two phases; and
determining, according to a difference between the intensity information of the at least two phases, whether to abandon the intensity information of the at least two phases corresponding to the pixel;
wherein determining whether to abandon the intensity information of the at least two phases corresponding to the pixel comprises:
determining whether the difference is greater than a difference threshold; and
in response to the difference being greater than the difference threshold, abandoning the intensity information of the at least two phases corresponding to the pixel.

8. Sensing device based on ToF ranging according to claim 7, wherein the processing method further comprises:
adaptively adjusting an exposure time of detecting the modulation light of the at least two phases by the modulation-light receiving circuit to obtain again the intensity information of at least two phases corresponding to the pixel at a different time point.

9. Sensing device based on ToF ranging according to claim 7, further comprising:
an attitude sensor, sensing an attitude of the sensing device, and accordingly generating attitude information, the processing method further comprising:
in response to the difference being greater than a difference threshold, determining, according to the attitude information, whether motion blur causing the difference is global or local;
in response to the motion blur being global, abandoning the intensity information of the at least two phases corresponding to the pixel, and obtaining again, by the modulation-light receiving circuit, the intensity information of at least two phases corresponding to the pixel at a different time point; and
in response to the motion blur being local, determining, according to a blur pixel quantity, whether to obtain again, by the modulation-light receiving circuit, the intensity information of at least two phases corresponding to the pixel at a different time point, wherein the blur pixel quantity is a quantity accumulated in response to being determined to have the motion blur.

10. Processing method based on time-of-flight (ToF) ranging, comprising:
obtaining intensity information of at least two phases corresponding to at least one pixel, wherein the intensity information is generated by sensing a modulation light with time delays using the at least two phases; and
determining, according to a difference between the intensity information of the at least two phases, whether to abandon the intensity information of the at least two phases corresponding to the pixel;
wherein determining whether to abandon the intensity information of the at least two phases corresponding to the pixel comprises:

determining whether the difference is greater than a difference threshold; and in response to the difference being greater than the difference threshold, abandoning the intensity information of the at least two phases corresponding to the pixel.

11. Processing method based on ToF ranging according to claim 10, wherein after determining whether to abandon the intensity information of the at least two phases corresponding to the pixel, the method further comprises:

adaptively adjusting an exposure time of detecting the modulation light of the at least two phases to obtain again the intensity information of at least two phases corresponding to the pixel at a different time point.

12. Processing method based on ToF ranging according to claim 10, wherein determining whether to abandon the intensity information of the at least two phases corresponding to the pixel comprises:

in response to abandoning the intensity information of the at least two phases corresponding to the pixel, determining whether to obtain again the intensity information of at least two phases corresponding to the pixel at a different time point; and computing depth information according to the intensity information of different phases corresponding to a plurality of pixels.

13. Processing method based on ToF ranging according to claim 12, wherein after determining whether the difference is greater than the difference threshold, the method further comprises:

obtaining attitude information, wherein the attitude information corresponds to a device for sensing the modulation light of the at least two phases;

in response to the difference being greater than the difference threshold, determining, according to the attitude information, whether motion blur causing the difference is global or local;

in response to the motion blur being global, abandoning the intensity information of the at least two phases corresponding to the pixel, and obtaining again the intensity info, nation of at least two phases corresponding to the pixel at a different time point; and in response to the motion blur being local, determining, according to a blur pixel quantity, whether to obtain again the intensity information of at least two phases corresponding to the pixel at a different time point, wherein the blur pixel quantity is a quantity accumulated in response to the pixel being determined to have the motion blur.

14. Processing method based on ToF ranging according to claim 13, wherein after determining whether the difference is greater than the difference threshold, the method further comprises:

in response to the blur pixel quantity being greater than a quantity threshold, abandoning the intensity information of the at least two phases corresponding to the pixel, and obtaining again the intensity information of at least two phases corresponding to the pixel at a different time point.

15. Processing method based on ToF ranging according to claim 12, wherein after determining whether the difference is greater than the difference threshold, the method further comprises:

in response to the difference being greater than the difference threshold, abandoning the intensity information of the different phases corresponding to at least one of the pixels, wherein the at least one abandoned pixel is determined to have the motion blur; and computing the depth information according to the intensity information of the different phases corresponding to a plurality of pixels that are not abandoned among the pixels.

* * * * *